June 29, 1943.  W. A. EATON  2,323,207
BRAKE MECHANISM
Filed Jan. 18, 1940   3 Sheets-Sheet 1

Inventor
Wilfred A. Eaton.
By N. D. Parker Jr.
Attorney

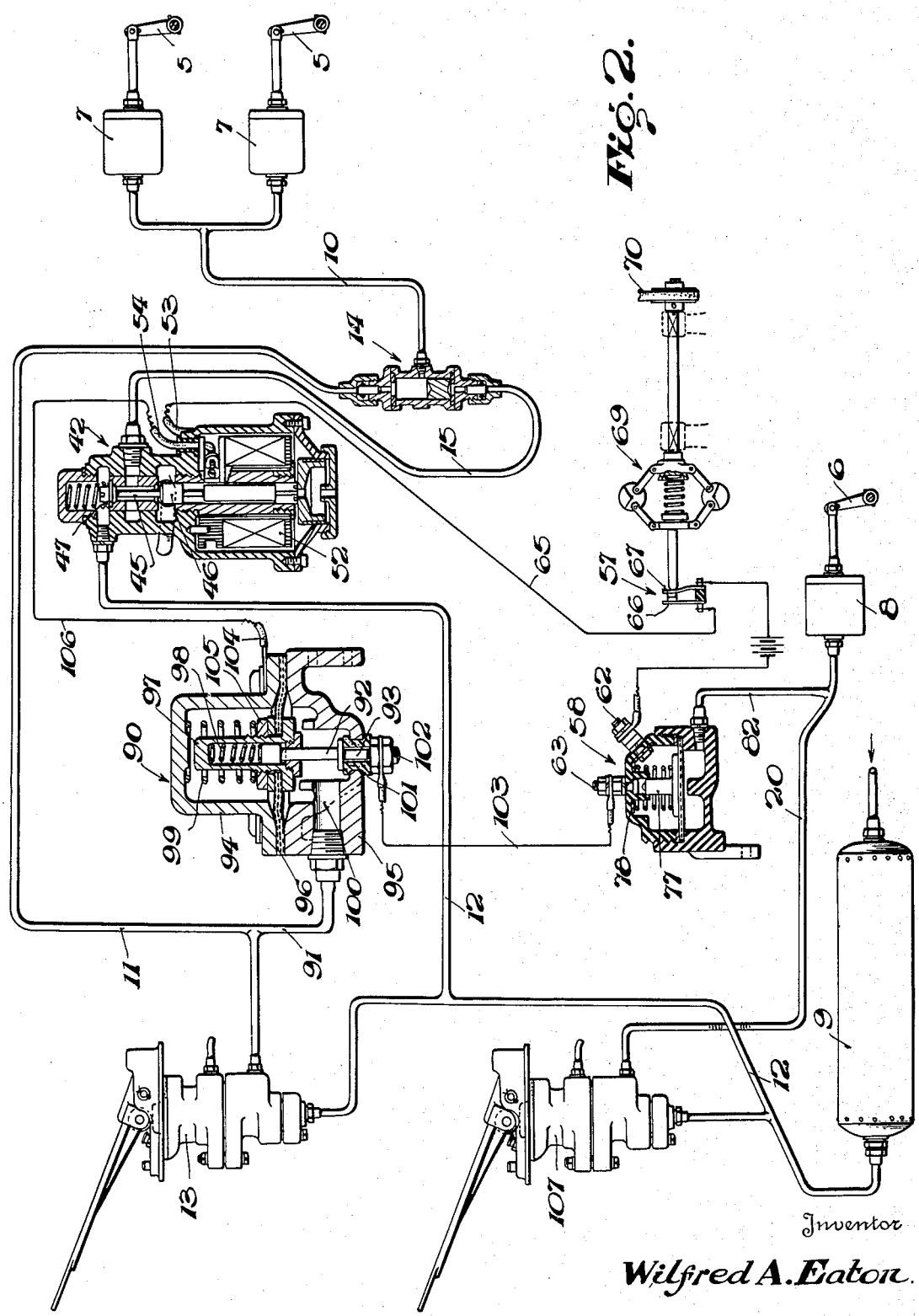

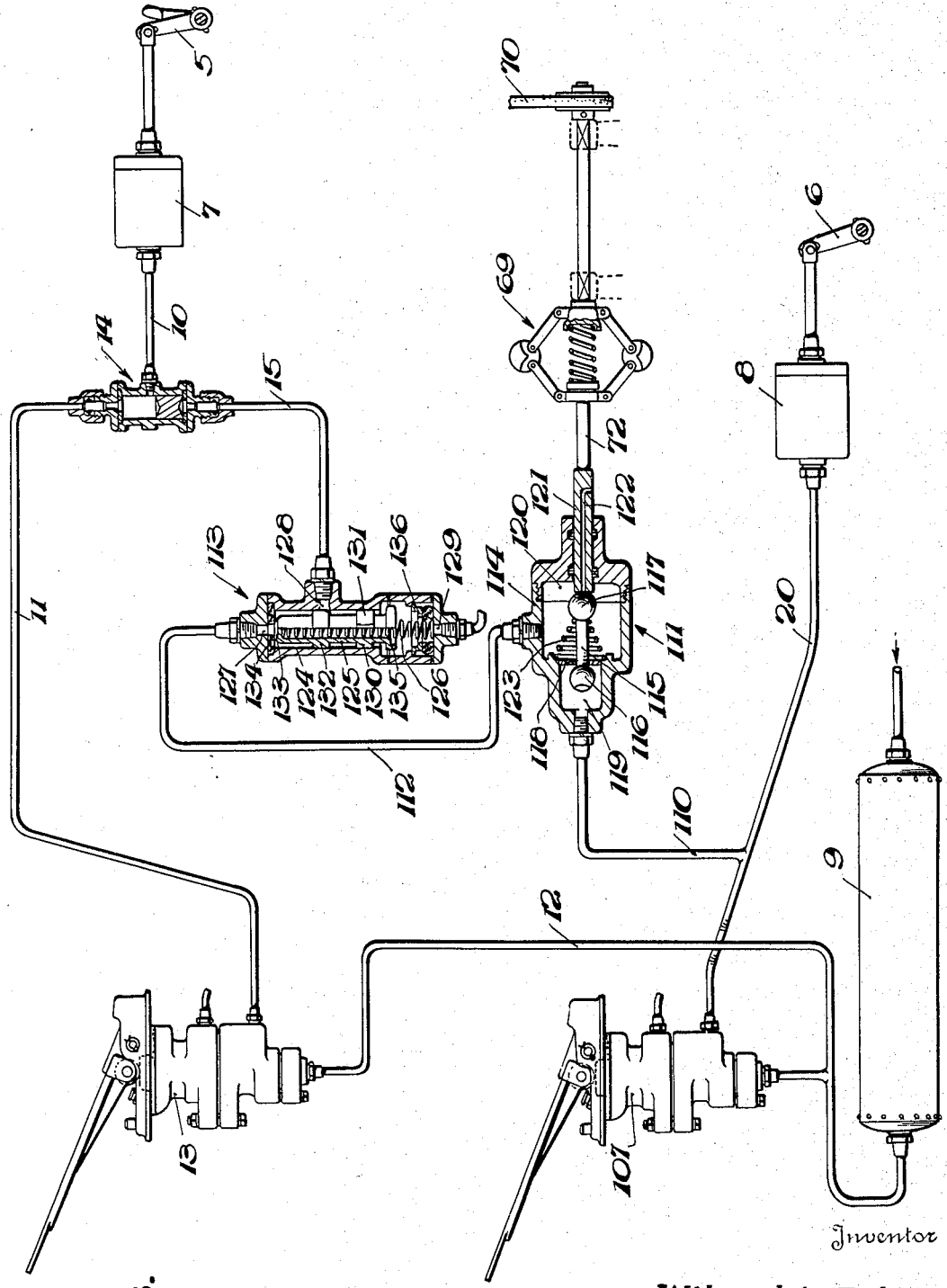

Patented June 29, 1943

2,323,207

UNITED STATES PATENT OFFICE 2,323,207

BRAKE MECHANISM

Wilfred A. Eaton, Pittsburgh, Pa., assignor to Bendix-Westinghouse Automotive Air Brake Company, Pittsburgh, Pa., a corporation of Delaware Application January 18, 1940, Serial No. 314,538

17 Claims. (Cl. 192—13)

This invention relates to vehicle braking systems and more particularly to a construction providing for the coordination of vehicle brake and clutch actuating means.

One of the objects of the present invention is to provide a novel arrangement for automatically maintaining the brakes of a vehicle applied under certain conditions of operation, the construction being such that the brakes may be kept in applied position without the necessity of the operator maintaining his foot upon the brake pedal. Such a construction greatly facilitates the operation and control of motor vehicles under crowded traffic conditions and avoids any tendency of the vehicle to roll down hill after a stop and during the time when the operator changes his foot from the brake pedal to the accelerator pedal when proceeding forwardly after such stop.

Another object is to provide a construction of the above character wherein the vehicle braking system will be automatically maintained in applied position as soon as the vehicle has been brought to rest by the manipulation of the usual brake pedal, such an arrangement permitting the operator to thereafter remove his foot from such pedal.

Still another object resides in the coordination of the vehicle clutch and brake systems so that, when the motion of the vehicle is arrested and the clutch is disengaged, the braking system will be automatically maintained in applied position.

A further object comprehends a novel vehicle control system wherein the vehicle brakes will automatically be held applied after the vehicle has been stopped, and will not be released until the operator shifts the transmission into gear and accelerates the engine in the usual manner to move the vehicle from rest.

A still further object is to provide a novel controlling mechanism of the above character which will be especially adaptable for motor vehicles equipped with fluid pressure braking systems.

Other objects and novel features of the invention will appear more fully hereinafter from the following detailed description when taken in connection with the accompanying drawings, wherein three embodiments of the invention are illustrated. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 2 is a diagrammatic view, partly in section, of a modified form of the invention, and Fig. 3 is a diagrammatic view, partly in section, of still another modification.

Figure 1:
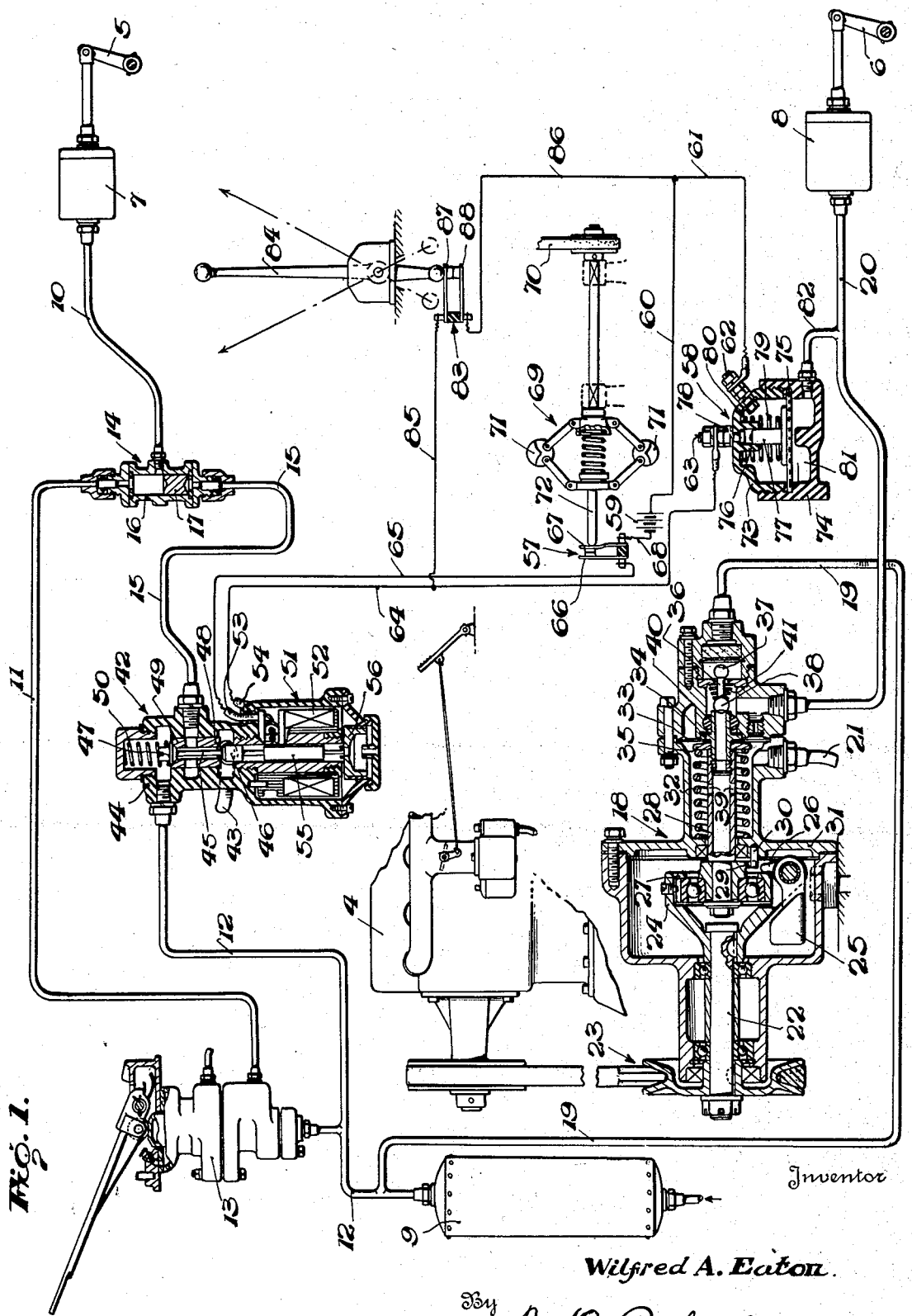
Fig. 1 is a diagrammatic view, partly in section, of a vehicle controlling mechanism constructed in accordance with the present invention.

Referring more particularly to Fig. 1, a vehicle controlling mechanism constructed in accordance with the principles of the present invention is illustrated therein in combination with a motor vehicle having an engine 4, a braking system 5 and a clutch system 6. Preferably, the brake and clutch systems are controlled by fluid actuators 7 and 8 respectively, a source of compressed air 9 being provided for energizing the actuators. While the use of compressed air for actuating the clutch and brake systems is illustrated in the drawings and will be referred to in the following description, it is to be understood that any suitable source of fluid power may be employed, such as a liquid under pressure or the vacuum obtainable from the intake manifold of the engine.

In order to control communication between the brake actuator 7 and the source or reservoir 9, these two devices are connected by conduits 10, 11 and 12, a suitable manually-operable controlling valve 13 forming the connection between conduits 11 and 12. The valve mechanism 13 may be constructed in any suitable manner but is preferably constituted as disclosed in the patent to William J. Andres and Roy S. Sanford, No. 2,133,275, granted October 18, 1938, for Control mechanism. Interposed between conduits 10 and 11 is a double check valve 14 in order to permit flow of fluid pressure to the conduit 10 from either conduit 11 or a conduit 15, the latter being provided for a purpose which will appear more fully hereinafter. As shown, the check valve 14 includes a casing 16 housing a valve element 17 movable to one extremity or the other in the casing 16 in order to interconnect conduits 10 and 11 or conduits 10 and 15.

Means are also provided for controlling the clutch-engaging and disengaging movements of the clutch actuator 8 and preferably such means are so constructed that the clutch is disengaged when the engine 4 is idling and is permitted to engage when the speed of the engine is gradually increased. As shown, such means include a centrifugally-controlled valvular mechanism 18 which is preferably constructed in accordance with the application of Roy S. Sanford, Serial No. 171,570, filed October 28, 1937, issued as Patent No. 2,228,612, dated Jan. 14, 1941, for Vehicle control mechanism. With the engine 4 idling, the valvular mechanism 18 serves to conduct fluid pressure from reservoir 9 to the clutch actuator 8 by way of a conduit 19, valvular mechanism 18 and a conduit 20. When the speed of the engine 4 is increased above idling speed, valvular mechanism 18 operates in such a manner as to exhaust fluid from the clutch actuator 8 through conduit 20, valvular mechanism 18 and an exhaust connection 21, and the construction is such that the fluid pressure is gradually exhausted, thus permitting the vehicle clutch to be smoothly engaged through the action of the usual clutch return springs associated therewith.

More particularly, the centrifugally-operated valvular mechanism 18 includes a shaft 22 drivably connected at one end with the engine through a belt and pulley drive 23, the other end of the shaft having a rotor 24 secured thereto and provided with a plurality of centrifugally-actuated levers, one of which is shown at 25. These latter levers are adapted to cooperate through an arm 26 with a bearing 27 which is capable of a limited sliding movement with respect to the rotor. The bearing 27 is adapted to pilot at one end a valve-actuating member 28, and the latter is maintained in a non-rotatable condition as by means of an extension 29 adapted to embrace a stud 30 carried by a casing 31 of the valvular mechanism 18. From this construction, it will be readily perceived that, as the speed of rotor 24 increases, centrifugal force will effect a movement of levers 25 about their pivotal mountings in order to cause levers 26 to move bearing 27 and valve-actuating member 28 to the left, as viewed in Fig. 1. The latter member is normally urged toward the right, as viewed in this figure, through a spring 32 confined between a portion of the casing 31 and a diaphragm 33 secured to member 28 as by means of elements 34 and 35.

The valvular mechanism 18, in addition to the centrifugally-operated actuating device heretofore described, also includes a valve structure comprising a valve 36 provided with intake and exhaust heads 37 and 38 respectively, the intake head, when opened, serving to connect conduits 19 and 20, and the exhaust valve head 38, when opened, serving to connect conduits 20 and 21. This latter connection includes a plurality of ports 39 positioned in the member 28 and also includes a member 40 which is hollow and is adapted to form at its right hand extremity a seat for the exhaust valve head 38. The valve 36 has associated therewith a spring 41 which constantly tends to urge the intake valve head towards closed position.

Preferably, the parts of the centrifugally-operated valvular mechanism 18 are so initially adjusted that, with the engine idling, the spring 32 serves to move the valve-actuating member 28 to the right in order to effect contact between member 40 and exhaust valve head 38 and move the intake valve 37 off its seat. Under these conditions, fluid pressure will be conducted from conduit 19 to conduit 20, and as heretofore described, the clutch actuator will be energized in order to effect disengagement of the vehicle clutch. When engagement of the clutch is desired, the engine speed is increased and the valve-actuating member 28 will be moved to the left, as viewed in Fig. 1, through the action of the centrifugally-operable members 25. Thus, the intake valve head 37 will be closed by means of spring 41 and member 40 will be moved away from the exhaust valve head 38 in order to gradually connect conduit 20 with the atmospheric exhaust conduit 21 through member 40 and ports 39. Thus, the vehicle clutch may be smoothly engaged through the control of the engine speed.

The present invention, as illustrated in Fig. 1, provides a supplemental means for applying the brakes under certain conditions of vehicle operation and independently of the released position of the brake valve 13. Preferably, such independent brake-applying and releasing means is effective to apply the brakes when the motion of the vehicle has been arrested and the clutch is disengaged, it being understood that the words motion of the vehicle as used above and hereinafter refer to movement of the vehicle along its path of travel from one point to another. With such an arrangement, control of the vehicle is greatly simplified since, under the conditions above specified, the vehicle brakes will be applied and the operator will be relieved of the necessity of keeping his foot upon the pedal of the brake valve 13. Such a construction is especially desirable for preventing the vehicle from rolling backwards on a down grade when it is desired to either arrest the motion of the vehicle because of traffic conditions or move the vehicle forwardly in first gear.

In order to provide the aforementioned auxiliary or supplementary brake-applying means, a valvular mechanism 42 is interposed between conduit 15 and conduit 12 and, when opened to connect these conduits, serves to conduct fluid pressure from the reservoir 9 to the brake chamber 7 by way of double check valve 14 and conduit 10. The valve 42 is so constructed as to close the connection between conduits 12 and 15 and connect the latter to an atmospheric connection 43 in order to exhaust the brake chamber 7 under certain conditions of operation which will appear hereinafter.

Preferably, the valve 42 may take the form of any suitable type of electromagnetically-controlled valvular mechanism. As shown, the valve includes a casing 44 having a valve 45 therein, the latter being provided with an exhaust head 46 and an intake head 47 respectively cooperable with seats 48 and 49. A spring 50 normally serves to maintain the valve 45 in the position shown where the intake valve head 47 is closed, while the exhaust valve head 46 is opened. Under these conditions, conduit 15 is carried to the atmospheric connection 43 while communication between conduits 12 and 15 is interrupted. The valve 45 is moved to open position by an electromagnetic solenoid 51, the latter including a coil 52 having terminals 53 and 54, and surrounding an element 55 secured to an armature 56. The construction is such that, upon energization of the coil 52, armature 56 will be drawn upwardly in order to impart opening movement to the valve 45 through element 55. Upon deenergization of the coil 52, spring 50 is effective to return the valve 45 to the position shown in Fig. 1.

Means are provided for controlling the energization of the coil 52 and, as illustrated, such means are not only responsive to the speed of the vehicle but also dependent upon energization of the vehicle clutch actuator. As shown, a switch 57 responsive to vehicle speed and a switch 58 responsive to energization of the clutch actuator are arranged in series circuit with the coil 52 and a source of energy such as a battery 59. Such circuit includes connections 60 and 61, connecting one side of the battery 59 with a terminal 62 of switch 58. The latter switch is also provided with a terminal 63 electrically connected to terminal 54 of coil 52 by a wire 64, the other terminal 53 of coil 52 having a wire 65 connected thereto which is also connected to the switch 57. As shown, switch 57 comprises a pair of spring contacts 66 and 67, the latter being connected to the other terminal of battery 59 as by means of wire 68.

Normally, when the motion of the vehicle is arrested, spring contacts 66 and 67 are closed through the action of a speed-responsive governor 69 which may be drivably connected through any suitable means 70 to any driven part of the vehicle, the motion of which is arrested when the motion of the vehicle is stopped, such as, for example, the propeller shaft, not shown. As soon as the motion of the vehicle is initiated, however, the construction of the governor 69 is such that the centrifugally-operable weights 71 will cause actuating member 72 to be moved to the right, as viewed in Fig. 1, in order to permit the spring contacts 66 and 67 to be moved to open position.

The switch mechanism 58, which as above indicated, is controlled by energization of the clutch actuator, comprises upper and lower casing sections 73 and 74 confining a pressure-responsive element, such as a diaphragm 75, therebetween. As shown, the upper casing section 73 is composed of insulating material and is formed with a downwardly-depending skirt 76 for receiving and guiding a contact member 77 resting upon the diaphragm 75. The upper portion of the contact member 77 is normally spaced from a contact 78 electrically connected with terminal 63 and is maintained in this position as by means of a spring 79. The upper portion of spring 79 is in constant engagement with a conductor 80 which is electrically connected with terminal 62, it being apparent from this construction that, when contact member 77 engages contact 78, an electrical connection will be made from terminal 62 to terminal 63 through conductor 80, spring 79, contact member 77 and contact 78. In the position shown in Fig. 1, however, there is no electrical connection between the terminals 62 and 63 by reason of the separation of contacts 77 and 78.

In order to actuate the switch 58 in accordance with the energization of the clutch actuator 8, space or chamber 81 beneath diaphragm 75, and formed by the lower casing section 74, is connected with conduit 20 as by means of a conduit 82. Thus, upon energization of the clutch actuator 8 and increase in pressure in conduits 20 and 82 and chamber 81, diaphragm 75 and contact 77 will be moved upwardly, as viewed in Fig. 1, in order to complete the connection between terminals 62 and 63. Preferably, the tension of spring 79 is such that a substantial pressure will be required in chamber 81 before the aforementioned completion of the circuit between terminals 62 and 63 is effected. This pressure is selected to be of such a value that the clutch actuator 8 will be moved to a position to effect complete disengagement of the vehicle clutch before contacts 77 and 78 are engaged. This insures disengagement of the clutch before the auxiliary valve 42 opens to apply the brakes. It will be, moreover, understood that, as the pressure within chamber 81 is relieved in order to permit reengagement of the vehicle clutch, contacts 77 and 78 will be separated prior to engagement of the clutch, thus enabling actuation of the auxiliary valve 42 to release the brakes prior to clutch engagement. For the purpose of adjusting the closing and opening action of contacts 77 and 78, it is to be pointed out that the casing sections 73 and 74 are adjustably threaded together and thus may be adjusted one with respect to the other in order to vary the tension of spring 79 to obtain the action above referred to. Should it be necessary, in order to properly adjust the tension of spring 79, to move the casing section 73 outwardly with respect to casing section 74, it will be understood that one or more shims may be inserted above the diaphragm 75 for engagement with the lower periphery of the upper hollow casing section 73 for the purpose of maintaining the marginal portion of the diaphragm in fluid-tight engagement with the lower casing section 74.

With the construction heretofore provided, it will be understood that, with the motion of the vehicle arrested, and the engine 4 idling, the supplemental brake-applying valve 42 will be operated in order to conduct fluid pressure from the reservoir 9 to the brake actuator 7 through conduits 12, 15 and 10. Assuming that the vehicle is arrested under these conditions, the operator may sometimes find it desirable to accelerate the engine. Such action, however, would cause engagement of the vehicle clutch through operation of the centrifugally-controlled valve mechanism which would exhaust the clutch actuator 8. Engagement of the vehicle clutch through release of the pressure in conduit 20 would, of course, open valve 58, deenergizing coil 52 and causing operation of valve 42 to release the brakes. If the vehicle were on an up grade, the operator, under these conditions, would find it necessary to reapply the brakes through operation of the brake valve 13. In order to avoid this and enable the operator to accelerate the engine under the conditions above specified, a supplemental switch 83 is associated with the vehicle gear shift lever 84, such switch being arranged in parallel with the switch 58 as by means of conductors 85 and 86 respectively associated with conductors 64 and 61. Switch 83 comprises a pair of spring contacts 87 and 88 respectively connected to conductors 85 and 86, and such spring contacts are normally closed when the gear shift lever 84 is in neutral position. However, when the latter lever is moved out of neutral position, as indicated in the dotted lines, the switch 83 is permitted to open and, in such position, exerts no controlling effect whatsoever upon the coil 52 of valve 42. With this arrangement, it will be readily perceived that, once the valve 42 has been operated to apply the brakes, the gear shift lever 84 being in neutral position at this time, engagement of the clutch through increase in speed of the engine 4 will not deenergize coil 52 even though switch 58 is broken. Under these conditions, coil 52 will remain energized by reason of the series circuit including closed switches 57 and 83.

A slightly modified form of the invention is disclosed in Fig. 2. In this embodiment, the arrangement is such that the effects of an instantaneous braking application by conducting full reservoir pressure to the brake actuator 7 through the operation of valve 42 may be relieved should the circuit of the valve 42 be closed and the valve thus energized prior to stopping of the vehicle. While the centrifugally-operated device 69 is designed to close switch 57 when the motion of the vehicle has been completely arrested, it is possible that this switch may be closed when the vehicle speed has dropped to a relatively low value, such as, for example, three to five miles per hour. Should closure of the switch 57 occur at this speed, it will be readily understood that, in the event of closure of switch 58, secured by energization of the clutch actuator 8, coil 52 will be energized to open valve 42 and thus conduct full reservoir pressure to the brake chamber 7 by way of conduits 12 and 15, double check valve 14 and conduit 10. This would result in an instantaneous application of the vehicle brakes and would cause discomfort to the passengers.

In order to provide means for effecting the foregoing, the completion of the circuit to coil 52 is made dependent upon substantial deenergization of the brake actuators as caused by manipulation of brake valve 13. As shown, a pressure-responsive switch 90 is subjected to the pressure of the fluid in conduit 11, through a conduit 91, and includes a pair of switch contact members 92 and 93 arranged in series between terminal 63 of switch 58 and terminal 54 of coil 52 and the arrangement is such that, when conduit 91 is exhausted or the pressure dropped to a relatively low value, contacts 92 and 93 will be closed.

More particularly, the switch 90 includes a casing having upper and lower sections 94 and 95 respectively and having a pressure-responsive diaphragm 96 clamped therebetween. Switch housing member 97 is carried by the diaphragm 96 and supports the contact member 92, a spring 98 tending to maintain the switch member 92 in the position illustrated. The diaphragm 96 is constantly urged in such a direction as to tend to engage contacts 92 and 93 as by means of a spring 99. Lower casing section 95 defines a chamber 100 beneath diaphragm 96, and, when fluid pressure in this chamber is exhausted or reduced to a relatively low value, spring 99 is of such a nature as to effect contact between members 92 and 93. The last named contact member is carried by the lower casing section 95 in a suitable insulating bushing 101 and is connected to a terminal 102, the latter being electrically connected to terminal 63 of switch 58 by conductor 103. Contact member 92 is electrically connected to terminal 104 through spring 98, housing 97, a nut 105, spring 99 and upper casing section 90. The terminal 104 is connected with terminal 54 of switch 42 through a conductor 106.

Although, in this form of the invention, the clutch actuator 8 may be controlled by a centrifugally-operable valve mechanism such as that similar to the valve 18 of Fig. 1, a manually-operable controlling valve may also be used if desired. As shown, Fig. 2, a manually-operable controlling valve mechanism 107, similar in construction to the valve device 13, is interconnected between conduits 12 and 20 and may be manually manipulated in a well known manner for controlling the degree of energization of the clutch actuator 8. As in the case of Fig. 1, switch device 58 is subjected to the pressure of the fluid conducted to the clutch actuator as by means of conduit 82 and this switch functions in precisely the same manner as the corresponding switch of Fig. 1. In the arrangement of Fig. 2, the switch 57 is also included in the series circuit including switches 58 and 90 and, as in the case of Fig. 1, is actuated by a centrifugally-responsive device 69 which is connected to any suitable driven part of the vehicle by the drive mechanism 70.

A further form of the invention is shown in Fig. 3 and includes a brake system 5 adapted to be controlled through operation of the brake valve 13 and includes also the clutch system 6, controlled through manipulation of the clutch valve 107. The source of fluid pressure 9 is connected to the clutch and brake valves by means of conduit 12 as in the two previously described forms of the invention.

In the modification of Fig. 3, the electrical means of Figs. 1 and 2 for controlling the application of the vehicle brakes independently of operation of the brake pedal 13 is dispensed with and a mechanically-operable arrangement is provided. As shown, under certain conditions of operation, fluid pressure from conduit 20 is supplied to the brake actuator 7 through a conduit 110, valve device 111, conduit 112, valve device 113, conduit 15, double check valve 14 and conduit 10. Valve device 111 comprises a casing 114 having a valve 115 therein provided with intake and exhaust heads 116 and 117 respectively. The intake valve head 116 is adapted to cooperate with a seat 118 and, when closed, cuts off communication between an intake chamber 119 and an outlet chamber 120. Valve 115 is adapted to be actuated by means of a valve actuating member 121 having a bore 122 formed therein communicating with the atmosphere. Normally, the valve 115 is urged to the right, as viewed in Fig. 3, through the action of a spring 123 and is operated in the opposite direction by sliding movement of the operating member 121 through the action of the centrifugally-operable member 69 drivably connected with the driven part of the vehicle. At zero vehicle speed, the centrifugally-operable mechanism 69 moves the valve-operating member 121 to the left, as viewed in Fig. 3, the left hand extremity of which engages the exhaust valve head 117 and moves the valve 115 to such a position as to establish communication between chambers 119 and 120. When the vehicle moves, however, the centrifugally-operable device 69 is so constituted that member 72 will be moved to the right, as viewed in Fig. 3, thereby permitting spring 123 to close the intake valve 116 and open chamber 120 to the atmosphere through passage 122. Thus, when the motion of the vehicle is arrested, conduits 110 and 112 will be connected while the latter conduit will be connected to atmosphere when the vehicle is in motion.

Valve device 113 interconnecting conduits 112 and 15 is preferably constructed in accordance with the disclosure of the patent to Roy S. Sanford, No. 2,128,165, granted August 23, 1938, for Vehicle control mechanism. As shown, the valve device 113 includes a casing 124 having a valve 125 slidably arranged therein and normally urged to the position shown as by means of a spring 126. The casing 124 is provided with inlet and outlet ports 127 and 128, an exhaust port 129 being provided at the lower part of the casing. In the position illustrated, the outlet port 128 communicates with the exhaust port 129 past a guide 130 provided with a plurality of flats 131. Communication between the outlet port 128 and the inlet port is prevented by a valve part 132 and a skirt 133 which contacts a seat 134. It will be noticed that the skirt 133 defines a relatively small area at the top of valve 125 which is subjected to the pressure of the fluid in the intake port 127 when the valve is in the position shown in Fig. 3. The tension of spring 126 is adjusted in such a manner that the pressure in the intake 127 must rise to a value corresponding substantially to the pressure required to cause clutch-disengaging movement of the clutch actuator 8 before valve 125 moves downwardly. When the pressure in the intake port 127 reaches this value, the valve 125 moves downwardly, as viewed in Fig. 3, and, as soon as the skirt 133 leaves the seat 134, it will be understood that the pressure will act upon a substantially enlarged portion of the valve 125, namely the valve part 132. When this occurs, the valve 125 will be moved downwardly with a snap action to a point where ports 127 and 128 are in open communication and the exhaust port 129 is closed by engagement of a skirt 135 with an element 136. Fluid pressure from the conduit 112 may then be conducted through the valve device 113 to the brake actuator 7 to apply the vehicle brakes following disengagement of the vehicle clutch, and assuming, of course, that the motion of the vehicle has been arrested and valve device 111 connects conduits 110 and 112.

Deenergization of the vehicle brake system is controlled solely by reducing the pressure of the fluid in the clutch actuator 8 through manipulation of the clutch valve 107. When this occurs, valve device 113 is of such nature as to remain open and maintain communication between conduits 15 and 112 until the pressure of the fluid in the clutch actuator and conduit 20 is reduced substantially to a value where the clutch is about to engage. When this pressure is released, spring 126 of valve device 113 will snap valve member 125 downwardly to close communication between ports 127 and 128 and establish communication between the latter port and the exhaust port 129. Conduit 15 and brake actuator 7 will thus be exhausted to atmosphere and the brakes released prior to actual engagement of the clutch. Subsequent manipulation of the clutch valve 107 will serve to further release the pressure in the clutch actuator 8 in order to permit the vehicle clutch to be smoothly engaged under the action of the usual return springs associated therewith.

In operation of that form of the invention disclosed in Fig. 1, it will be understood that the brake system 5 may be controlled in the usual manner by means of the brake valve 13, operation of which serves to connect reservoir 9 to brake actuator 7 through conduits 12 and 11, double check valve 14 and conduit 10. Normal operation of the clutch system 6 is controlled solely by operation of the centrifugal valve mechanism 18 through variations in the speed of the vehicle engine 4 as has been heretofore pointed out in detail. In the event that the motion of the vehicle has been arrested and the speed of the engine 4 is reduced to normal idling, it will be apparent that switches 57 and 58 will be closed through the respective action of the centrifugal device 69 and the pressure in clutch conduit 20, thus energizing coil 52 to effect upward movement of valve 45 of the valve device 42. Such operation of the valve 45 serves to supply the brake actuator 7 with reservoir pressure through conduits 12 and 15, double check valve 14 and conduit 10. Thus, the brakes are automatically held applied when the motion of the vehicle is arrested and the clutch is disengaged. The provision of the switch 83, closed by moving the gear shift lever 84 to neutral position, permits the operator to accelerate the engine 4 without causing release of the brakes. The operation of the system under these conditions is such that the circuit for maintaining coil 52 energized is a series circuit including closed switches 57 and 83. When engine 4 is accelerated, it will be recalled that conduit 20 leading to the clutch actuator 8 is exhausted and switch 58 is opened. When it is desired to move the vehicle forwardly in first gear, for example, it is only necessary to move the gear lever 84 to first gear position. This, of course, permits switch 83 to be opened but the coil 52 is still maintained energized as by means of closed switches 57 and 58. Upon acceleration of the engine with the transmission established in first gear ratio, the centrifugal valvular mechanism 18 will operate to gradually exhaust the fluid in the clutch actuator 8. The pressure-responsive switch 58 is so constructed, however, as heretofore pointed out, that contacts 77 and 78 will be opened prior to actual engagement of the clutch. Thus, the circuit to the coil 52 will be interrupted and the spring 50 acting upon the valve 45 of valve device 42 will close the intake valve head 47 and open the exhaust valve head 46. This action will connect conduit 15 to the atmospheric connection 43 and thus the brake actuator 7 will be exhausted through conduit 10, double check valve 14 and conduit 15 to the atmosphere. Further increase in speed of the engine 4 will serve to further decrease the pressure of the fluid in the clutch actuator 8, thus permitting the vehicle clutch to be smoothly engaged under the action of the usual return springs associated therewith.

With reference to the operation of the modification disclosed in Fig. 2, it will be recalled that the circuit for energizing coil 52 in order to connect the brake actuators 7 with the reservoir 9 is controlled by switches 57, 58 and 90, all arranged in series relation. In the event that the motion of the vehicle has been arrested, switch 57 will be closed. Switch 58 will also be closed by reason of the fluid pressure in conduit 20 and clutch actuator 8, admitted to the latter by operation of clutch valve 107 to disengage the clutch. Assuming that the operator has released pressure upon the brake valve 13, no pressure will be present in chamber 100 beneath the diaphragm 96 of the valve device 90 and contacts 92 and 93 will also be closed. Under these conditions, energization of coil 52 will operate valve device 42 to connect conduits 12 and 15 and thus conduct fluid pressure to the brake actuators 7. In the event, however, that switches 90 and 58 are closed and switch 57 closes at a relatively low vehicle speed, as for example three to five miles per hour, it will be understood that full reservoir pressure is applied to the brake actuator 7. In order to avoid the disadvantageous results which would accompany such action, the valve device 90 is so constructed that it is only necessary for the operator to exert sufficient pressure upon the pedal of the brake valve 13 to admit a relatively slight pressure to the brake conduit 11 and to the chamber 100. For example, the spring 99 may be so constructed that a pressure of ten pounds per square inch admitted to the chamber 100 would cause disengagement of the contacts 92 and 93. The circuit to coil 52 would thus be immediately interrupted, valve 45 would be moved to exhaust position and the pressure in the brake chamber 7 reduced to an amount equal to the slight pressure admitted to conduit 11 by the above referred to operation of the brake valve 13. Thus, the disadvantageous results which would follow from full application of the vehicle brakes while the vehicle is moving may be readily controlled by the brake valve 13.

In the operation of the form of the invention shown in Fig. 3, the brake and clutch actuators 7 and 8 respectively may be controlled during ordinary operation of the vehicle as in the modification shown in Fig. 2. Assuming, however, that the motion of the vehicle is arrested and that clutch valve 107 is operated to effect disengagement of the vehicle clutch, fluid pressure from the clutch conduit 20 will be conducted to the brake actuator 7 by way of conduit 110, valve device 111, conduit 112, valve device 113, conduit 15, double check valve 14 and conduit 10. In the operation of valve device 113, it will be recalled that the valve 125 thereof will not be moved to open position until conduit 112 is supplied with fluid pressure substantially equal to that required to disengage the clutch. When it is desired to move the vehicle forwardly in gear, it is only necessary to operate the clutch valve 107 to gradually exhaust the pressure in the clutch actuator 8. As soon as the pressure in conduit 112 reaches a value slightly above that at which the clutch begins to engage, valve 125 will be snapped to closed position through the action of spring 126, thereupon immediately connecting the brake chamber 7 to the atmospheric connection 129 of valve device 113 through conduit 10, double check valve 14 and conduit 15. Thereafter, further operation of valve 107 will serve to further release the fluid pressure in clutch actuator 8 and permit the clutch to become engaged.

There is thus provided by the present invention a series of novel arrangements for controlling the action of a vehicle braking system in such a manner that, when the motion of the vehicle has been arrested, the brakes are automatically applied and it will not be necessary for the operator to maintain his foot on the brake pedal. Such constructions, it will be readily appreciated, offer the advantages of simplified control and ease of manipulation of vehicles under crowded conditions of traffic and especially when vehicles are required to be stopped on up grades.

While several embodiments of the invention have been disclosed herein and described with considerable particularity, it is to be understood that modifications and changes may be resorted to without departing from the spirit of the invention, as well understood by those skilled in the art. Reference will, therefore, be had to the appended claims for a definition of the limits of the invention.

What is claimed is:

1. In a motor vehicle provided with a fluid pressure braking system and a clutch device, a source of fluid pressure, a brake chamber, a fluid pressure-operated clutch motor, means including a valve for connecting said source and chamber to apply the brake in service, means including a separate valve for connecting said source and motor to energize the latter to operate said clutch device, and means responsive respectively to energization of said motor and the stopping of said vehicle for connecting said brake chamber and source.

2. In a motor vehicle provided with a fluid braking system and a clutch device, a source of fluid pressure, a brake chamber, a brake valve for supplying fluid pressure from said source to said chamber, and means operable to connect said source and brake chamber upon energization of said clutch device including a device responsive to the speed of the vehicle.

3. In a motor vehicle provided with a fluid braking system and a clutch device, means for actuating said device, a source of fluid pressure, a brake chamber, a brake valve for supplying fluid pressure from said source to said chamber, other means for supplying fluid pressure to said chamber from said source, a valve in said other means, and means for opening said last named valve including means responsive to the energization of said first named means and a device responsive to the speed of the vehicle.

4. In a motor vehicle provided with a fluid pressure braking system and a clutch device, a source of fluid pressure, a brake chamber, a fluid pressure-operated clutch motor, means including a valve for connecting said source and chamber to apply the brake in service, means including a separate valve for connecting said source and motor to energize the latter to operate said clutch device, and other means for connecting said source and chamber including controlling mechanism having a device responsive to the fluid pressure in said motor and another device responsive to the speed of the vehicle.

5. In a motor vehicle having a fluid pressure braking system and a fluid pressure-operated clutch system, means to control the braking system to apply the brakes, mechanism to control the clutch system to operate the vehicle clutch, and means to control application of the brakes during operation of said mechanism, said last named means including means responsive to the pressure in the clutch system and a device actuated to operative position by the stopping of the vehicle.

6. In a motor vehicle having brakes and a clutch-controlling member, operator-controlled means for controlling applying and releasing of the brakes, means for operating said member, and other means for controlling applying and releasing of said brakes dependent upon operation of said second means and the stopping of said vehicle.

7. In a motor vehicle provided with a fluid braking system and a clutch device, a source of fluid power, a brake chamber, a valve for controlling communication between said source and chamber to cause application and release of the brakes, a connection between said chamber and source, a valve in said connection, and means to control the last named valve including a device responsive to energization of said clutch device and a mechanism responsive to the speed of the vehicle.

8. In a motor vehicle having brakes and a clutch device, means for controlling applying and releasing the brakes, other means for controlling applying and releasing the brakes, and means dependent upon operation of said clutch device and the stopping of the vehicle for controlling said other means.

9. A mechanism of the class described comprising a brake-operating member, a clutch-operating member, operator-controlled means for controlling energization of said brake member, a fluid motor connected with said clutch member, means for controlling the energization of said motor, other means for controlling energization of said brake member, and controlling means for said other means actuated when the vehicle stops and the motor is energized to a predetermined degree.

10. In a motor vehicle having a fluid pressure braking system and a fluid pressure-operated clutch device, a source of fluid power, valve means for controlling communication between said braking system and source, a valve device for connecting said source and clutch device, means separate from said valve means for connecting the braking system and source, a valve in said separate means, and means for opening the last named valve when the vehicle stops and the pressure of the fluid supplied said clutch device reaches a predetermined value.

11. In a motor vehicle having a fluid pressure braking system and a fluid pressure-operated clutch device, a source of fluid power, valve means for controlling communication between said braking system and source, a valve device for connecting said source and clutch device, means separate from said valve means for connecting the braking system and source, a valve in said separate means, electromagnetic means for opening said valve, and a circuit for controlling the electromagnetic means comprising a pair of switches arranged in series, one of said switches being controlled in accordance with the speed of the vehicle while the other is controlled in accordance with the degree of energization of said clutch device.

12. In a motor vehicle having an engine, brakes, a clutch device and a gear shift member, means for controlling applying and releasing of the brakes, other means for controlling applying and releasing of the brakes, means responsive to engine speed for controlling the clutch device, mechanism for controlling said other means to effect application of the brakes, and means to control said mechanism including means actuated by said gear shift member and a device responsive to vehicle speed.

13. A vehicle brake system comprising means under the control of the operator for controlling applying and releasing of the brakes, auxiliary means for controlling applying and releasing of the brakes, separate operator-controlled means for effecting brake-releasing action of said auxiliary means, and means operable in response to brake-releasing action of said first named means for controlling the auxiliary means for applying the brakes including a device responsive to vehicle speed.

14. A vehicle brake system comprising operator-controlled means for controlling applying and releasing of the brakes, separate brake-applying and releasing controlling means, means including a device responsive to vehicle speed for operating said separate means in response to release of said first means, and means controlled by the operator for rendering said separate means effective for releasing the brakes.

15. In a motor vehicle having a fluid pressure braking system and a fluid pressure-operated clutch system, a source of fluid pressure, a conduit connecting said source and braking system, a valve in said conduit, a second conduit connecting the source and clutch system, a valve device in said second conduit, and means connecting said second conduit and the braking system comprising a valve governed by vehicle speed and a second valve movable to open position at a predetermined pressure and movable to closed position at a different predetermined pressure.

16. The combination in a motor vehicle having an engine, brakes and operator controlled means for controlling applying and releasing of the brakes, of other means for controlling applying and releasing of the brakes and means controlled by the speed of the engine and by the speed of the vehicle for controlling the operation of said other means.

17. The combination in a motor vehicle having an engine, brakes and operator controlled means for controlling applying and releasing of the brakes, of other means for controlling applying and releasing of the brakes and means operative when the vehicle and engine are stopped for rendering said other means effective to apply the brakes.

WILFRED A. EATON.